(12) United States Patent
Jurkewitz

(10) Patent No.: US 9,405,983 B2
(45) Date of Patent: Aug. 2, 2016

(54) QUALITY CONTROL METHOD FOR PRINTED PRODUCTS USING 3D DIGITAL PROOFING

(71) Applicant: HEIDELBERGER DRUCKMASCHINEN AG, Heidelberg (DE)

(72) Inventor: Manfred Jurkewitz, Wiesloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/603,578

(22) Filed: Jan. 23, 2015

(65) Prior Publication Data

US 2015/0206020 A1    Jul. 23, 2015

(30) Foreign Application Priority Data

Jan. 23, 2014   (DE) .......................... 10 2014 000 876

(51) Int. Cl.
| | | |
|---|---|---|
| G06K 9/00 | (2006.01) | |
| G06K 9/03 | (2006.01) | |
| B41F 33/00 | (2006.01) | |
| H04N 1/387 | (2006.01) | |
| G06F 3/041 | (2006.01) | |
| G06T 15/00 | (2011.01) | |
| G06F 3/0488 | (2013.01) | |
| G06F 3/01 | (2006.01) | |

(52) U.S. Cl.
CPC ................ *G06K 9/036* (2013.01); *B41F 33/00* (2013.01); *G06F 3/017* (2013.01); *G06F 3/041* (2013.01); *G06T 15/00* (2013.01); *H04N 1/387* (2013.01); *G06F 3/013* (2013.01); *G06F 3/0488* (2013.01); *G06T 2207/10004* (2013.01); *G06T 2207/30144* (2013.01)

(58) Field of Classification Search
None
See application file for complete search history.

(56) References Cited

U.S. PATENT DOCUMENTS

| 8,213,688 | B2 | 7/2012 | Hauck et al. | |
|---|---|---|---|---|
| 2004/0215689 | A1* | 10/2004 | Dooley | G06K 9/00335 709/200 |
| 2011/0273731 | A1* | 11/2011 | Haikin | G06F 3/013 358/1.9 |

(Continued)

FOREIGN PATENT DOCUMENTS

| DE | 102007020511 A1 | 11/2007 |
|---|---|---|
| DE | 102007057208 A1 | 5/2009 |

(Continued)

OTHER PUBLICATIONS

Windows 8 Touchpad gesture implementation guide, Oct. 12, 2012.*

*Primary Examiner* — Randolph I Chu
(74) *Attorney, Agent, or Firm* — Laurence A. Greenberg; Werner H. Stemer; Ralph E. Locher

(57) ABSTRACT

A quality control method for printed products at a control console includes recording image information of the printed product with a camera device, comparing the recorded data to digital image data of the printed image in a computer, displaying a digital version of the printed product on a screen associated with the control console and illuminating the printed product with at least one light source. The printed product is sensed by using at least one sensor, the position of the printed product relative to the light source and/or relative to the angle of vision of a person is calculated by using a computer, and the displayed digitized version of the printed product is displayed on the screen in accordance with or corresponding to the position of the real printed product.

7 Claims, 1 Drawing Sheet

(56) References Cited

U.S. PATENT DOCUMENTS

2012/0307265 A1* 12/2012 Jacobs ................ G06K 15/027
358/1.9
2014/0146360 A1   5/2014 Berg et al.

FOREIGN PATENT DOCUMENTS

| DE | 102012022882 A1 | 5/2014 |
| DE | 102014101545 A1 | 8/2014 |
| WO | 2014122280 A1 | 8/2014 |

* cited by examiner

QUALITY CONTROL METHOD FOR PRINTED PRODUCTS USING 3D DIGITAL PROOFING

CROSS-REFERENCE TO RELATED APPLICATION

This application claims the priority, under 35 U.S.C. §119, of German Patent Application DE 10 2014 000 876.2, filed Jan. 23, 2014; the prior application is herewith incorporated by reference in its entirety.

BACKGROUND OF THE INVENTION

Field of the Invention

The present invention relates to a quality control method for printed products at a control console, in which a camera device records image information of the printed product, the recorded data are compared to digital image data of the printed image in a computer, a digital version of the printed product is displayed on a screen associated with the control console and the printed product is illuminated by at least one light source.

German Patent Application DE 10 2007 020 511 A1, corresponding to U.S. Pat. No. 8,213,688, discloses an operating device for printing presses in the form of a control console in which a printed product is placed on a deposition table of the control console and scanned by a camera device. The image data that are recorded in that way are compared in a computer to digital image data of the printed image. Operating or measuring processes are initiated as a function of the recorded image parameters. Objects or people that obscure the image may be recognized in that process. Specific operating and measuring processes are released as a function of the recognition.

In practice, print shops are known to forward print images on-line to workflow system suppliers, who then create a virtual three-dimensional print product based on the image files and make it available on-line to be downloaded by the print shops.

SUMMARY OF THE INVENTION

It is accordingly an object of the invention to provide a quality control method for printed products using 3D digital proofing, which overcomes the hereinafore-mentioned disadvantages of the heretofore-known methods of this general type and which creates a three-dimensional digitized version of the printed image to optimize quality control processes during production. A further object of the invention is to extend quality control measures to further parameters such as gloss or structural effects in addition to controlling color information.

With the foregoing and other objects in view there is provided, in accordance with the invention, a quality control method for printed products at a control console, in which a camera device records image information of the printed product, the recorded data are compared to digital image data of the printed image in a computer, a digital version of the printed product is displayed on a screen associated with the control console and the printed product is illuminated by at least one light source. The printed product is sensed by at least one sensor, the position of the printed product relative to the light source and/or relative to the angle of vision of a person is calculated by a computer and the displayed digital version of the printed product on the screen is displayed in accordance with the position of the real printed product.

The quality control method of the invention is particularly suited for use in the context of sheet-fed lithographic printing presses. In sheet-fed lithographic offset printing presses, sample sheets need to be taken at regular intervals. Those sample sheets need to be examined to detect deviations between the printed sheets and the original image and to initiate appropriate corrective steps when necessary. The printed product is scanned by a camera device at the control console for that purpose. The recorded data are compared to digital image data of the printed image in a computer. A digital version of the printed product is displayed on a screen associated with the control console. The printed product is illuminated by at least one light source. The printed product is furthermore sensed by at least one sensor and the computer calculates the position of the printed product relative to the light source. If the position of the real printed product changes, the position of the digital printed product that is being displayed in three dimensions on the screen will also change. This allows effects to be displayed that would otherwise be impossible to represent in a mere elevational view of the virtual printed product, such as light reflections on the printed product or structural effects that only become visible if the angle of observation is different from 90°.

In accordance with a first further development of the invention, the at least one sensor detects the position of the operator and the operator's angle of observation of the printed material and the representation of the digital printed image on the screen changes in accordance with the angle of observation of the operator with respect to the real printed product.

In accordance with an advantageous further development, the screen for displaying the digital printed product is a 3D screen, which allows structural effects on the virtual product, in particular, to be represented three-dimensionally in order to be examined more thoroughly by the operator.

In accordance with an advantageous further feature, an additional touch display that is likewise used to display the digital printed product is provided. In addition, the touch display may be used to implement commands for changing the representation. For instance, a specific swipe across the touch display may enlarge or displace a section of the digital printed product to take a closer look at specific areas of the digital printed product.

A particularly preferred embodiment of the method additionally envisages the use of gesture control. Combining the present method with gesture control provides a very intuitive and convenient way of implementing the quality control process for the operating staff. For example, the operator may use one hand to hold a printed product with a structured surface at the light source at an angle to be able to discern the structure both on the printed product and on the screen, and may use the other hand to make specific gestures that initiate a zooming function to allow an even closer look.

Other features which are considered as characteristic for the invention are set forth in the appended claims.

Although the invention is illustrated and described herein as embodied in a quality control method for printed products using 3D digital proofing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
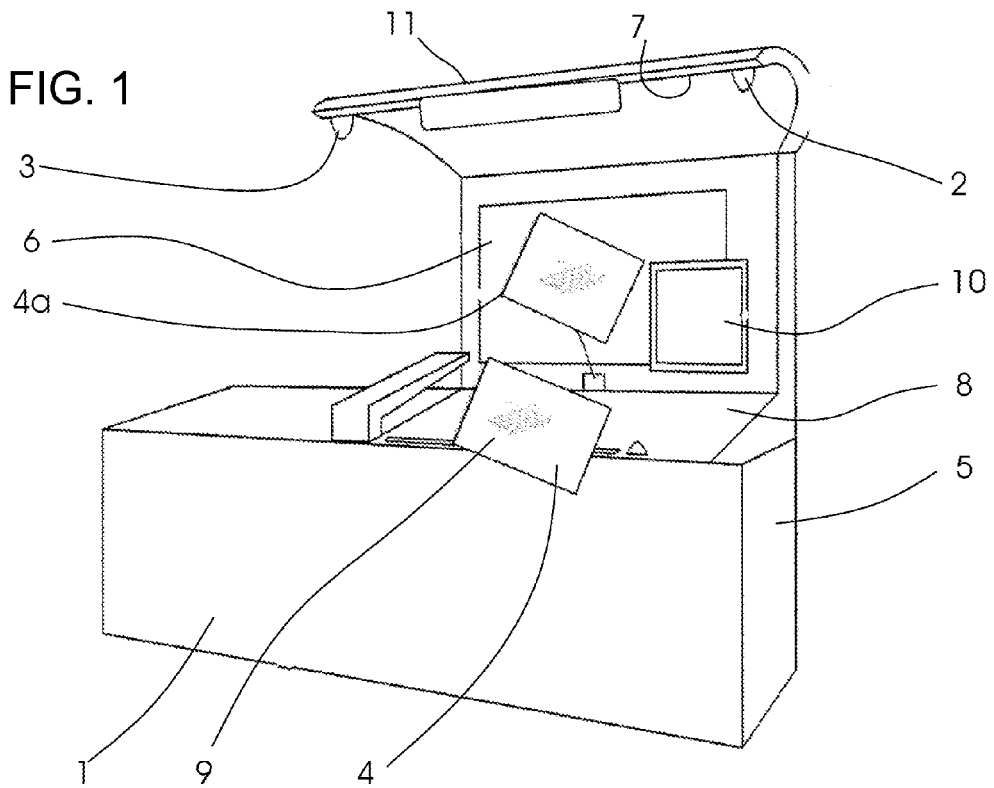
FIG. 1 is a diagrammatic, perspective view of a printing press control console suited for carrying out the method of the invention and a printing substrate located thereon.

Referring now to the figures of the drawings in detail and first, particularly, to FIG. 1 thereof, there is seen a control console 1 including a deposition table 8. A printed product in the form of a sheet 4 is positioned on the deposition table 8 for inspection. The printed product 4 is illuminated by a light source 7. A camera device 2 records the image information of a printed image 9 on the printed product 4 and sends the recorded image information to a computer 5 located inside the control console 1. A sensor device 3 senses the position of the printed product 4 and the angle of vision of a non-illustrated person who examines the printed product 4, and likewise transfers the recorded information to the computer 5, which calculates the position of the printed product 4 relative to the light source 7 and to the angle of vision of the person. For this purpose, the eyes of the person may be registered, for example, to detect the angle of vision.

A screen 6 displays a digital representation 4a of the printed product 4. If the position of the real printed product 4 is changed or the angle of vision of the person relative to the printed product 4 changes, the position of the digital printed product 4a changes accordingly. An optional touch display 10 lists commands for changing the representational options of the digital printed product 4a. Gesture control is provided in the form of a sensor bar 11 that recognizes control commands in the form of an operator's gestures and implements them on the screen 6.

Figure 1A:
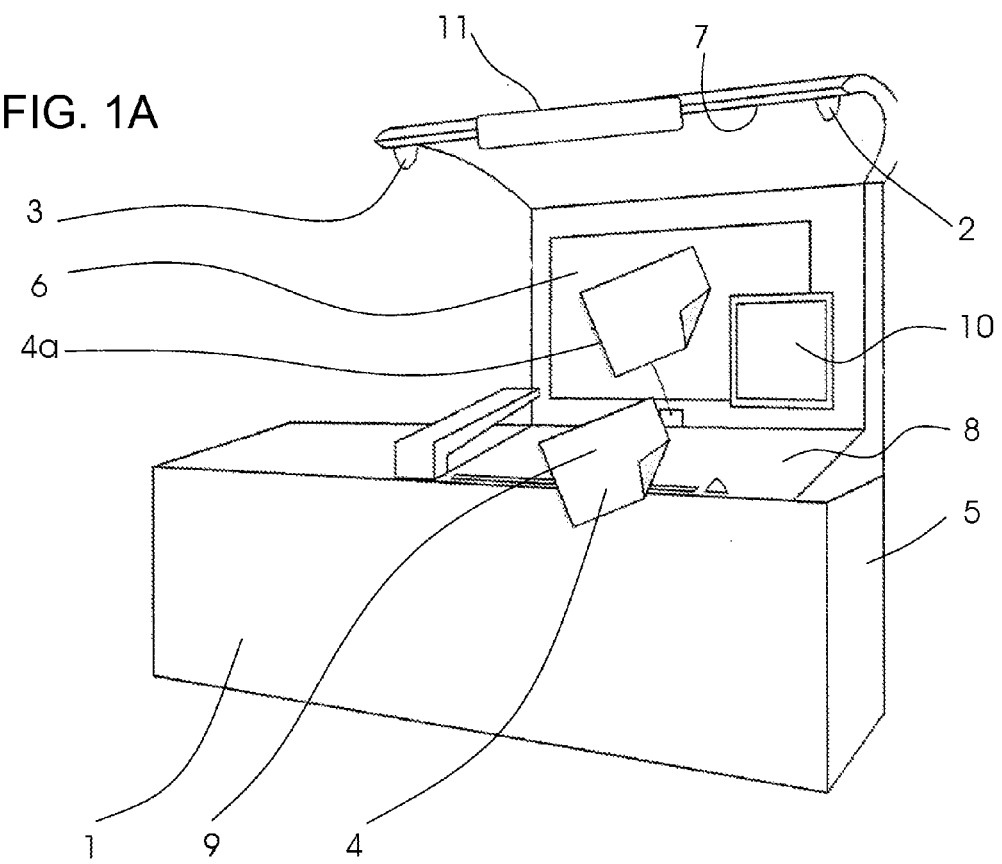
FIG. 1A is a perspective view of the control console of FIG. 1 and the same printing material in yet a different position.

FIG. 1A shows the control console 1 of FIG. 1 and the printed product 4 described above. The position of the printed product 4 has been modified, i.e. the printed product 4 has been rotated in a counter-clockwise direction and the lower right corner has been folded over. Both changes in the position of the printed product 4 in space have been repeated for the digitized printed product 4a on the screen 6.

The invention claimed is:

1. A quality control method for printed products at a control console, the method comprising the following steps:
    illuminating a real printed product using at least one light source;
    recording image information data of the real printed product using a camera device;
    comparing the recorded image information data to digital image data of the printed image in a computer;
    sensing the real printed product using at least one sensor;
    calculating a position of the real printed product relative to at least one of the light source or an angle of vision of a person, in the computer; and
    displaying a digital version of the printed product on a screen associated with the control console corresponding to a position of the real printed product.

2. The method according to claim 1, which further comprises:
    registering a position and the angle of vision of a person relative to the printed product using the at least one sensor; and
    displaying the digital version of the printed product three-dimensionally on the screen as a function of the position and angle of vision of the person relative to the real printed product.

3. The method according to claim 1, which further comprises:
    providing the screen for displaying the digital version of the printed product as a 3D screen; and
    displaying on the 3D screen at least one of the digital printed product three-dimensionally or a digital version of 3D effects of the real printed product.

4. The method according to claim 1, which further comprises providing the control console with an additional touch display on which the digital printed product is displayed and commands for changing representational options of the digital printed product may be initiated.

5. The method according to claim 4, wherein the representational options include zooming.

6. The method according to claim 1, which further comprises providing the control console with a device for gesture control.

7. The method according to claim 1, which further comprises carrying out the step of calculating a position of the real printed product relative to at least one of the light source or an angle of vision of a person, in the computer, by using the information of the real printed product sensed by the at least one sensor.

* * * * *